Patented Oct. 17, 1944

2,360,449

UNITED STATES PATENT OFFICE 2,360,449

PROCESS OF VULCANIZING RUBBER AND PRODUCT OBTAINED THEREBY

Robert L. Sibley, Nitro, W. Va., assignor to Monsanto Chemical Company, St. Louis, Mo., a corporation of Delaware No Drawing. Application July 22, 1941,
Serial No. 403,573

8 Claims. (Cl. 260—788)

The present invention relates to new vulcanization accelerators, to a process of vulcanizing rubber and to the vulcanization products obtained with the aid of the said new vulcanization accelerators.

The new and preferred class of rubber vulcanization accelerators comprise reaction products of primary aliphatic amines, paraformaldehyde and mercaptothiazoles. They are believed to possess the structure

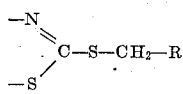

where R is the residue of the primary aliphatic amine the nitrogen atom probably being linked to the methylene group. While the chemical analyses are in agreement with the above configuration they obviously are not conclusive as to structure. For example the methylene group may be combined in the molecule in a different manner. Therefore it is not desired to limit the invention to a particular configuration. However, without limitation as to how the constituents are combined, the new accelerators may be called thiazyl 2-thio methylene primary aliphatic amines. While it is possible for the amine to react with the aldehyde without combining with the mercaptothiazole, it has been found that under relatively severe reacting conditions products derived from primary aliphatic amines are produced which are definitely thiazole reaction products. Similar condensations from amides are disclosed in United States Patent 2,126,670 granted to Scott and the method of condensation disclosed therein is applicable to primary aliphatic amines. On the other hand the methods disclosed in United States Patents 1,901,582 granted to Coleman and 1,972,918 granted to Bunbury et al. give only aldehyde amine condensation products.

The term "primary aliphatic amine" as employed in the present application, while including aliphatic diamines, alkyl amines by which it is meant to include alicyclic amines, excludes compounds containing a carbonyl or thio carbonyl group adjacent to a primary amino group. In other words it is meant to exclude true amides. The products obtained by reacting guanidines and biguanides containing a free —NH₂ group with paraformaldehyde and a mercapto thiazole are also useful accelerators.

Typical examples of mercapto-thiazoles which may be employed in the preparation of the preferred class of materials comprise 2-mercapto-4-methyl thiazole, 2-mercapto-benzothiazole, 2-mercapto - naphthathiazole, 2 - mercapto - 6 - nitrobenzothiazole, 2 - mercapto - 5 - chlorobenzothiazole, 2 - mercapto - 4 - methylbenzothiazole, 2 - mercapto - phenylbenzothiazole and equivalents and analogues thereof.

Typical examples of primary aliphatic amines and guanidines which may be employed in the preparation of the preferred class of materials comprise n-butyl amine, amyl amine, propyl amine, α hydroxy ethyl amine, cyanguanidine, o-tolyl biguanide, cyclohexylamine, β chlor butyl amine and equivalents and analogues thereof.

The following are specific examples of the preparation of the preferred new accelerators and are not in any sense limitative of the invention.

Substantially 21.0 parts by weight of cyanguanidine, 7.5 parts by weight of paraformaldehyde and 42 parts by weight of 2-mercaptobenzothiazole were stirred and heated together at 140–160° C. for about one hour, water being removed. The reaction mixture set to a hard brittle buff colored solid on cooling. The solid product was pulverized, extracted with dilute sodium carbonate solution to remove any unreacted mercaptobenzothiazole, washed with water and dried. This crude reaction product was analyzed for sulfur and found to contain 19.4% sulfur. The calculated amount for a pure product of the structure

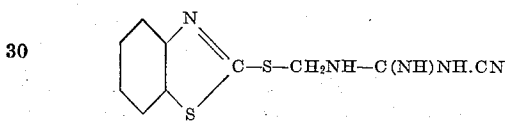

is 24.3% sulfur.

Substantially 48 parts by weight of o-tolyl biguanide and 7.5 parts by weight of paraformaldehyde were stirred and heated until a homogeneous liquid was formed and then heated for one-half hour at 70–100° C. 42 parts by weight of 2-mercaptobenzothiazole were then added and the mixture heated for one hour at 130–150° C. during which period water was driven off. The viscous liquid set to a hard brittle mass upon cooling. The solid product was pulverized, extracted with dilute sodium carbonate solution, washed with water and dried. The crude reaction product was found on analysis to contain 15.8% sulfur. The calculated amount for a pure product of the structure

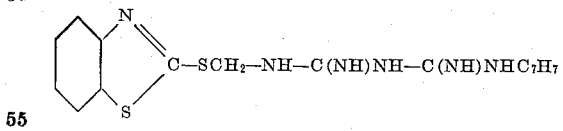

is 17.3%.

The above analyses indicate that the desired thiazyl 2 thio methylene primary aliphatic amines are obtained by vigorous heating of paraformaldehyde, the primary aliphatic amine and the mercapto thiazole. In similar manner thiazyl 2 thio N-methylene cyclohexylamine was prepared by initially combining paraformaldehyde and cyclohexylamine, adding mercapto-benzothiazole and heating for an hour at 140–150% C.

As specific embodiments of the invention but again without limiting the invention the above described products were incorporated in the usual manner into a rubber stock comprising

|  | Stock | | |
|---|---|---|---|
|  | A | B | C |
|  | Parts by weight | Parts by weight | Parts by weight |
| Pale crepe rubber | 100 | 100 | 100 |
| Whiting | 60 | 60 | 60 |
| Zinc oxide | 5 | 5 | 5 |
| Sulfur | 2 | 2 | 2 |
| Laurex | 0.25 | 0.25 | 0.25 |
| Benzothiazyl thio methylene cyclohexylamine | 1.0 |  |  |
| Benzothiazyl thio methylene cyanguanidine |  | 1.0 |  |
| Benzothiazyl thio methylene o-tolyl biguanide |  |  | 1.0 |

The stocks so compounded were cured in the usual manner at the temperature of 20 pounds steam pressure per square inch. The modulus and tensile properties of the cured rubber products are given in the following table.

Table

| Stock | Cure time in minutes | Modulus of elasticity in lbs./in.$^2$ at elongations of— | | Tensile at break in lbs./in.$^2$ | Ult. elong., per cent |
|---|---|---|---|---|---|
|  |  | 300% | 500% |  |  |
| A | 30 | 495 | 1,680 | 3,475 | 675 |
| B | 30 | 500 | 1,755 | 3,200 | 645 |
| C | 30 | 500 | 1,780 | 3,590 | 670 |
| A | 45 | 565 | 1,910 | 3,650 | 655 |
| B | 45 | 585 | 2,025 | 3,500 | 625 |
| C | 45 | 605 | 1,880 | 3,550 | 640 |
| A | 60 | 615 | 2,065 | 3,560 | 635 |
| B | 60 | 610 | 1,930 | 3,250 | 620 |
| C | 60 | 600 | 2,020 | 3,480 | 630 |

It is shown by the above data that the thiazyl 2-thio methylene primary aliphatic amines of the present invention are strong accelerators of the vulcanization of rubber.

The present invention is not limited to the specific examples hereinbefore set forth wherein the preferred accelerators are employed. For example, while the preferred class of materials exhibit strong accelerating properties as shown above when employed alone as accelerators, they may advantageously be employed in conjunction with organic nitrogen containing accelerators of a different class, as activators thereof, such for example, as diphenyl guanidine, di ortho tolyl guanidine, hexamethylene tetramine, Schiff's bases, aldehyde ammonia, cyclohexylamine, guanidine salts, for example diphenyl guanidine phthalate and analogues thereof. Furthermore, other ratios of the compounding ingredients than those mentioned in the examples as well as other well known fillers, pigments and the like may be employed in the production of various types of rubber compounds, and are apparent to those skilled in the art to which the present invention pertains. The present invention is limited solely by the claims attached hereto as part of the present specification.

This application is a continuation-in-part of application Serial No. 249,967 filed January 9, 1939.

What is claimed is:

1. The process of vulcanizing rubber which comprises heating rubber and sulfur in the presence of a mercaptothiazole reaction product obtained by vigorously heating paraformaldehyde, a primary alkyl amine and a mercapto thiazole at 130–160° C., water being driven from the reaction mixture.

2. The process of vulcanizing rubber which comprises heating rubber and sulfur in the presence of a mercapto arylene thiazole reaction product obtained by heating at 130–160° C. a mixture of paraformaldehyde, a primary alkyl amine and a mercapto arylene thiazole.

3. The process of vulcanizing rubber which comprises heating rubber and sulfur in the presence of a mercaptobenzothiazole reaction product obtained by vigorously heating paraformaldehyde, a primary amine and mercaptobenzothiazole at 130–160° C., water being driven from the reaction mixture.

4. The process of vulcanizing rubber which comprises heating rubber and sulfur in the presence of a mercaptobenzothiazole reaction product obtained by vigorously heating paraformaldehyde, cyclohexylamine and mercaptobenzothiazole at 130–160° C., water being driven from the reaction mixture.

5. The vulcanized rubber product obtained by heating rubber and sulfur in the presence of a mercaptothiazole reaction product obtained by vigorously heating paraformaldehyde, a primary alkyl amine and a mercapto thiazole at 130–160° C., water being driven from the reaction mixture.

6. The vulcanized rubber product obtained by heating rubber and sulfur in the presence of a mercapto arylene thiazole reaction product obtained by heating at 130–160° C. a mixture of paraformaldehyde, a primary alkyl amine and a mercapto arylene thiazole.

7. The vulcanized rubber product obtained by heating rubber and sulfur in the presence of a mercaptobenzothiazole reaction product obtained by vigorously heating paraformaldehyde, a primary alkyl amine and mercaptobenzothiazole at 130–160° C., water being driven from the reaction mixture.

8. The vulcanized rubber product obtained by heating rubber and sulfur in the presence of a mercaptobenzothiazole reaction product obtained by vigorously heating paraformaldehyde, cyclohexylamine and mercaptobenzothiazole at 130–160° C., water being driven from the reaction mixture.

ROBERT L. SIBLEY.